United States Patent [19]
Hudson

[11] Patent Number: 6,138,449
[45] Date of Patent: Oct. 31, 2000

[54] LOCK FOR A THRUST REVERSER MECHANISM AND A THRUST REVERSER MECHANISM

[75] Inventor: Philip Hudson, Wolverhampton, United Kingdom

[73] Assignee: Lucas Industries Public Limited Company, Solihull, United Kingdom

[21] Appl. No.: 08/975,586

[22] Filed: Nov. 21, 1997

[30] Foreign Application Priority Data

Nov. 30, 1996 [GB] United Kingdom .................... 9625001

[51] Int. Cl.⁷ ........................................................ F02K 1/54
[52] U.S. Cl. ............................................. 60/223; 60/226.2
[58] Field of Search ................................ 60/39.091, 223, 60/226.2, 230

[56] References Cited

U.S. PATENT DOCUMENTS

| | | | |
|---|---|---|---|
| 5,404,714 | 4/1995 | Davies | 60/226.2 |
| 5,448,884 | 9/1995 | Repp | 60/226.2 |
| 5,720,449 | 2/1998 | Laboure et al. | 60/226.2 |
| 5,819,527 | 10/1998 | Fournier | 60/226.2 |

FOREIGN PATENT DOCUMENTS

| | | |
|---|---|---|
| 450 881 | 3/1991 | European Pat. Off. . |
| 536 954 | 1/1992 | European Pat. Off. . |

*Primary Examiner*—Louis J. Casaregola
*Attorney, Agent, or Firm*—Andrus, Sceales, Starke & Sawall, LLP

[57] ABSTRACT

A lock for a thrust reverser mechanism having actuator means for operating a thrust reverser mechanism, includes a first lock device connectable, in use, to the actuator means for preventing actuation of the latter. The first lock device is operable hydraulically to unlock the lock so as to free the actuator means for operation. An electro-mechanical second lock device is arranged so as normally to prevent actuation of the first lock device and is operable to permit actuation of the first lock device when required.

16 Claims, 3 Drawing Sheets

LOCK FOR A THRUST REVERSER MECHANISM AND A THRUST REVERSER MECHANISM

The present invention relates to a lock for a thrust reverser mechanism and a thrust reverser mechanism, for example of the translating cowl type having a generally cylindrical cowl which surrounds an aircraft engine and is axially translatable to uncover forwardly directed louvres to redirect the engine exhaust gas.

A thrust reverser on an aircraft engine must only be deployed when the aircraft has landed. In order to avoid premature or other inadvertent deployment of the thrust reverser, a locking system is usually provided having primary locks to lock the thrust reverser cowl or other element in a stowed position.

Our earlier Patents EP 0536954 and its counterpart U.S. Pat. No. 5,280,704, which is herein incorporated by reference, describe a known thrust reverser system of the translating cowl type having a pair of piston/cylinder locking actuators for actuating the cowl, and a pair of hydraulic piston/cylinder feedback actuators which actuate the cowl and also provide feedback as to the position of the actuators, operation of the actuators being controlled by a hydraulic control unit. Each of the locking actuators includes a secondary hydraulically releasable lock, which secondary locks are automatically released in response to an application of hydraulic pressure to the locking actuators in response to a demand to deploy the thrust reverser. An electro-mechanical tertiary lock operates independently of the secondary hydraulic locks in order to prevent inadvertent deployment of the thrust reverser in the event, for example, of the locking actuators unlocking as a result of unwanted high pressure fluid becoming present in the actuators.

An object of the present invention is to provide an improved lock for a thrust reverser mechanism, as well as a thrust reverser mechanism incorporating such a lock.

According to a first aspect of the present invention, there is provided a lock for a thrust reverser mechanism having actuator means for operating a thrust reverser element, the lock comprising a lock device connectable, in use, to said actuator means for preventing operation of the latter, the lock device being operable hydraulically to unlock the lock so as to free the actuator means for operation, and an electro-mechanical baulking device arranged so as normally to prevent actuation of the lock device and being operable to permit actuation of the lock device when required.

The lock preferably includes connecting means adapted to connect the lock device, in use, to the actuator means, the lock device acting on the connecting means to prevent or limit operation of the actuator means.

The connecting means is conveniently an auxiliary rotary shaft for connection to a synchronising shaft interconnecting a plurality of actuator means, the lock device being arranged to prevent or limit rotational movement of the auxiliary shaft. Since the auxiliary shaft, with which the lock device cooperates in this arrangement, operates at high speed and low torque, the duty required by the hydraulic lock device is relatively low. The duty required by the baulking device is even lower, since it is only required to prevent movement of the hydraulic lock device.

It is known that for different aircraft, different types of thrust reverser mechanisms having synchronising shafts are employed having different actuators and different locks. It is thus possible to provide a lock which can be used with different types of thrust reverser mechanism employing different actuators.

The lock device may comprise at least one stop on the auxiliary shaft and at least one locking element, such as a pin, biassed towards a position of engagement with the at least one rotary stop.

The stop on the auxiliary shaft may conveniently be a radial arm carried by the shaft. Preferably, the locking element is movable away from the engagement position in a direction parallel to the axis of the auxiliary shaft.

Preferably, the electro-mechanical baulking device comprises a baulk member and a solenoid operable to withdraw the baulk member from its locking position.

The lock may include a self-calibrating or "self-rigging" transducer, such as is described in EP-B1-0 450 880 and its counterpart U.S. Pat. No. 5,047,933, the contents of which are herein incorporated by reference. Such a transducer is arranged to provide a feedback signal, in use, representing the positions of the actuators of the associated thrust reverser mechanism and it is not, therefore, necessary to provide each actuator with a transducer. Further, due to the absence of transducers in the actuators, wiring is only required to interconnect a hydraulic control unit and the lock. Thus, it is possible to provide a thrust reverser mechanism with less wiring.

Preferably, a manual drive mechanism is provided comprising a connector for receiving a drive tool, the drive mechanism being operable by the tool to move the or each locking element away from its engagement position.

The lock may be provided at an end portion of the synchronising shaft, which end portion may be located at a readily reached position when the thrust reverser mechanism is mounted on the aircraft engine. For instance, the end of the shaft and the lock may be arranged so that the lock is located on a lower part of the aircraft engine when the engine is fitted to an aircraft.

The manual drive mechanism may be arranged to rotate the auxiliary shaft and thereby operate the thrust reverser mechanism once the or each locking element has been moved away from the engaging position.

The manual drive mechanism may include a torque limiter operable to limit torque transmission from the drive tool to the auxiliary shaft.

According to a second aspect of the present invention, there is provided a piston/cylinder actuator in combination with a lock in accordance with the first aspect of the present invention.

According to a third aspect of the present invention, there is provided a thrust reverser mechanism including an actuator and lock combination in accordance with the second aspect of the present invention.

The invention will now be described, by way of example, with reference to the accompanying drawings, in which:

FIG. 4 is a fragmentary view of the rotor arms and lock pins of the lock of the present invention.

Like reference numerals refer to like parts throughout the drawings.

Figure 1:
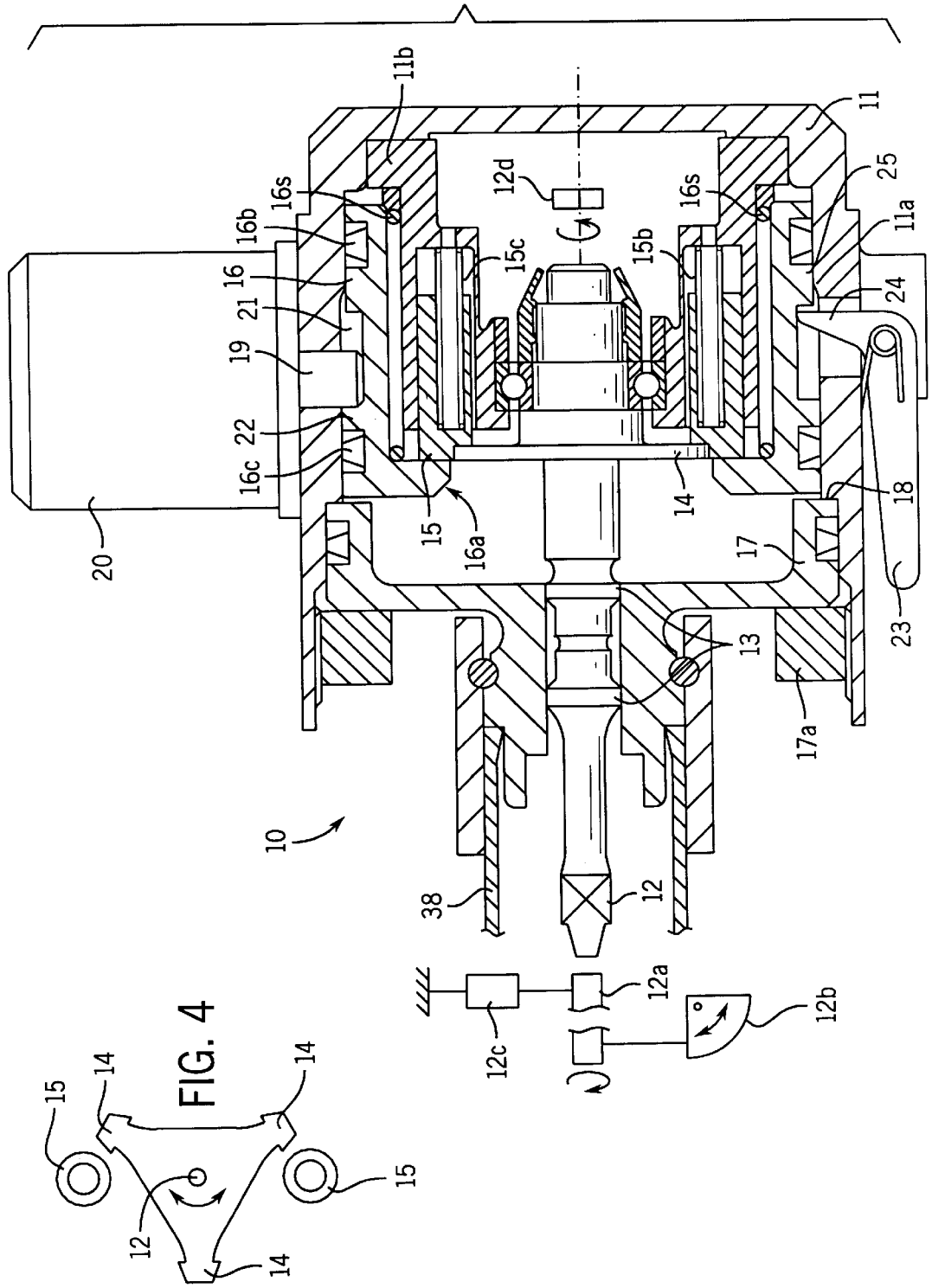
FIG. 1 is a cross-sectional view of a first embodiment of the lock of the present invention.

The lock 10 shown in FIG. 1 comprises a sealed housing 11 of generally annular cross-section for receiving hydraulic fluid and having a step 11a in the internal diameter to define different internal diameters in the housing 11. An auxiliary shaft 12 is connected to a synchronising shaft 12a which is surrounded by a pipe 38 carrying hydraulic fluid. Three angularly spaced rotor arms 14 extend radially from the auxiliary shaft 12. Two lock pins 15 are disposed about the auxiliary shaft 12 and are urged axially by respective springs 15b, 15c so as to extend through the spaces between the adjacent rotor arms 14 and engage the arms, as shown in FIG. 1. Each lock pin 15 is slidably supported in a carrier block 11b fixed in the housing 11, the lock pins being movable parallel to the auxiliary shaft 12 away from the engaging position by a generally annular unlocking sleeve 16. The unlocking sleeve 16 has a generally radially inwardly directed flange 16a, and respective first and second external diameters corresponding to the internal diameters of the housing 11 defined by the step 11a. The first and second external diameter surfaces of the unlocking sleeve 16 sealingly engage the respective internal diameter surfaces of the housing 11 by means of respective seals 16b, 16c. The unlocking sleeve is urged to the left by two springs 16s. An end cover 17 is disposed about the auxiliary shaft 12 and abuts a first shoulder 18 on the housing 11, being maintained in abutment with this shoulder by an internal nut 17a.

A baulk pin 19 is provided to prevent movement to the right of the unlocking sleeve 16, as viewed in the drawings. The baulk pin 19 is urged by a spring (not shown) into the position shown in FIG. 2 so as to be received by an elongate recess 21 and to engage a second shoulder 22 on the unlocking sleeve 16.

In order to unlock the lock 10, hydraulic pressure is applied through the pipe 38 to the internal volume of the housing 11 in response to a demand to deploy the thrust reverser cowl or other element. That is, the lands 13 on auxiliary shaft 12 enable the passage of hydraulic fluid from pipe 38 into the internal volume in housing 11. The pressure acts on both ends of the sleeve 16, but because of the difference in the internal diameters of the two housing 11 parts defined by the step 11a and of the two seals 16b, 16c, a rightwards resultant force is applied to the unlocking sleeve 16 by the hydraulic fluid. The applied force urges the unlocking sleeve 16 to the right against the two spring 16s, and longitudinally of the auxiliary shaft 12. However, the presence of the baulk pin 19 in the recess 21 prevents movement of the unlocking sleeve 16 unless the baulk pin 19 is retracted by actuating a solenoid 20 which is also initiated by a deploy demand. Retraction of the baulk pin 19 by the solenoid 20 permits the unlocking sleeve 16 to move to the right to engage the lock pins 15 and move them longitudinally of the auxiliary shaft 12 away from the engaging position, i.e. out of the plane in which the rotor arms 14 reside. Once the lock pins 15 have been moved out of the rotary path of the rotor arms 14, the auxiliary shaft 12 and the synchronising shaft 12a fast for rotation therewith are free to rotate.

When the hydraulic pressure is removed from the internal volume of the housing 11, the lock pins 15 are caused to re-engage the rotor arms 14 by leftward movement of the unlocking sleeve 16 under the action of the two springs 16s. Because of the presence of the elongate recess 21, this can happen irrespective of whether or not the baulk pin 19 engages the unlocking sleeve 16.

The auxiliary shaft 12 is provided with a ratchet (not shown) which permits the auxiliary shaft 12, and thereby the synchronising shaft 12a connected thereto, to rotate in one permitted direction when the lock pins 15 are in the engaging position. The direction of rotation permitted by the ratchet is chosen so as to permit the synchronising shaft 12a to rotate in the direction necessary to move a thrust reverser element 12b to a stowed position. The ratchet is required since no, or very little, hydraulic pressure is applied to the lock when a demand to stow the thrust reverser element 12b is made. Alternatively, a ratchet or actuator 12c such as piston/cylinder, may be provided on the or each end of the synchronising shaft 12a, the ratchet(s) or actuator(s) 12c being arranged to permit the synchronising shaft 12a to rotate in the permitted direction of rotation.

In order to achieve manual operation of the lock for maintenance purposes, a lever 23 is provided. The lever may be operated so that one of its ends 24 engages a third shoulder 25 on the unlocking sleeve 16, thereby forcing the lock pins 15 to move away from the engaging position when the baulk pin is retracted. Movement of the auxiliary shaft 12 and therefore the synchronising shaft 12a is then possible.

Figure 2:
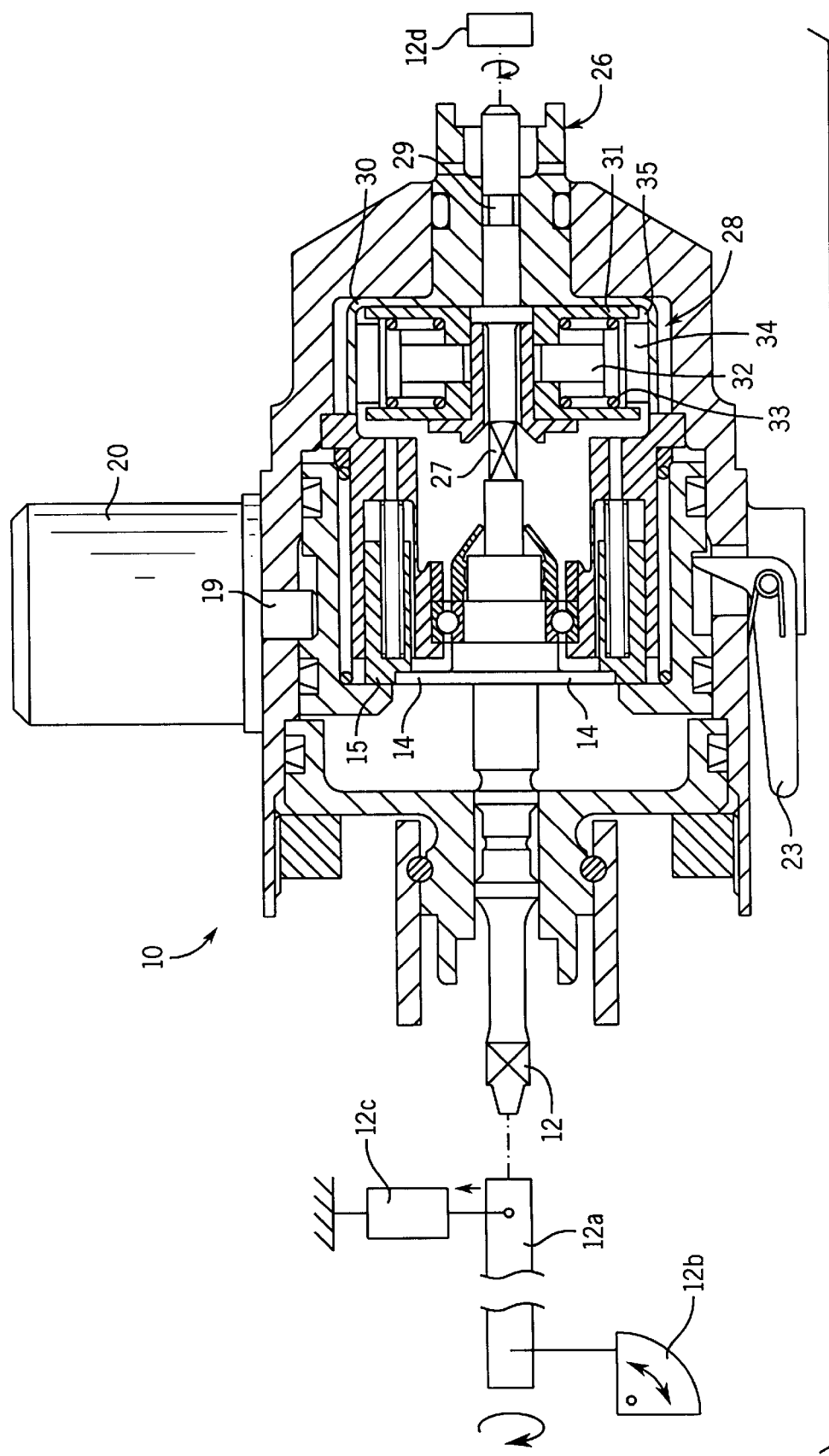
FIG. 2 is a cross-sectional view of a second embodiment of the lock of the present invention.

The lock shown in FIG. 2 differs from that shown in FIG. 1 in that a manual drive arrangement is provided which comprises a square socket 26 to receive a manual drive tool (not shown). A subshaft 29 is provided and is free to move axially within a torque limiting device 28. The torque limiting device 28 comprises an outer housing 30 and an inner housing 31. The inner housing 31 includes radial pistons 32 biased outwardly by springs 33. Each piston 32 is biased against a roller 34 which engages a groove 35 formed in the inner surface of the outer housing 30.

In order to use the manual drive arrangement, the solenoid 20 is actuated so as to retract the baulk pin 19 and hydraulic pressure is then applied to the lock, or the lever 23 is operated, to urge the lock pins 15 away from the engaging position with the arms 14. The manual drive tool is then inserted into the square socket 26 and forces the shaft 29 axially into engagement with a handwind end 27 of the auxiliary shaft 12. Rotation of the manual drive tool causes the outer housing 30 to rotate and this rotary motion is transferred via the rollers 34 and pistons 32 to the inner housing 31, rotation of which causes the subshaft 29 and thus the connected auxiliary shaft 12 to rotate. The strength of the springs 33 is such that if the torque applied by the manual drive tool becomes excessive as a result, for example, of the shaft 12, jamming, the springs 33 yield to permit inward movement of the pistons 32 to retract the rollers 34 from the grooves 35. The outer housing 30 can then rotate independently of the inner housing 31, thereby preventing the application of excessive torque.

Figure 3:
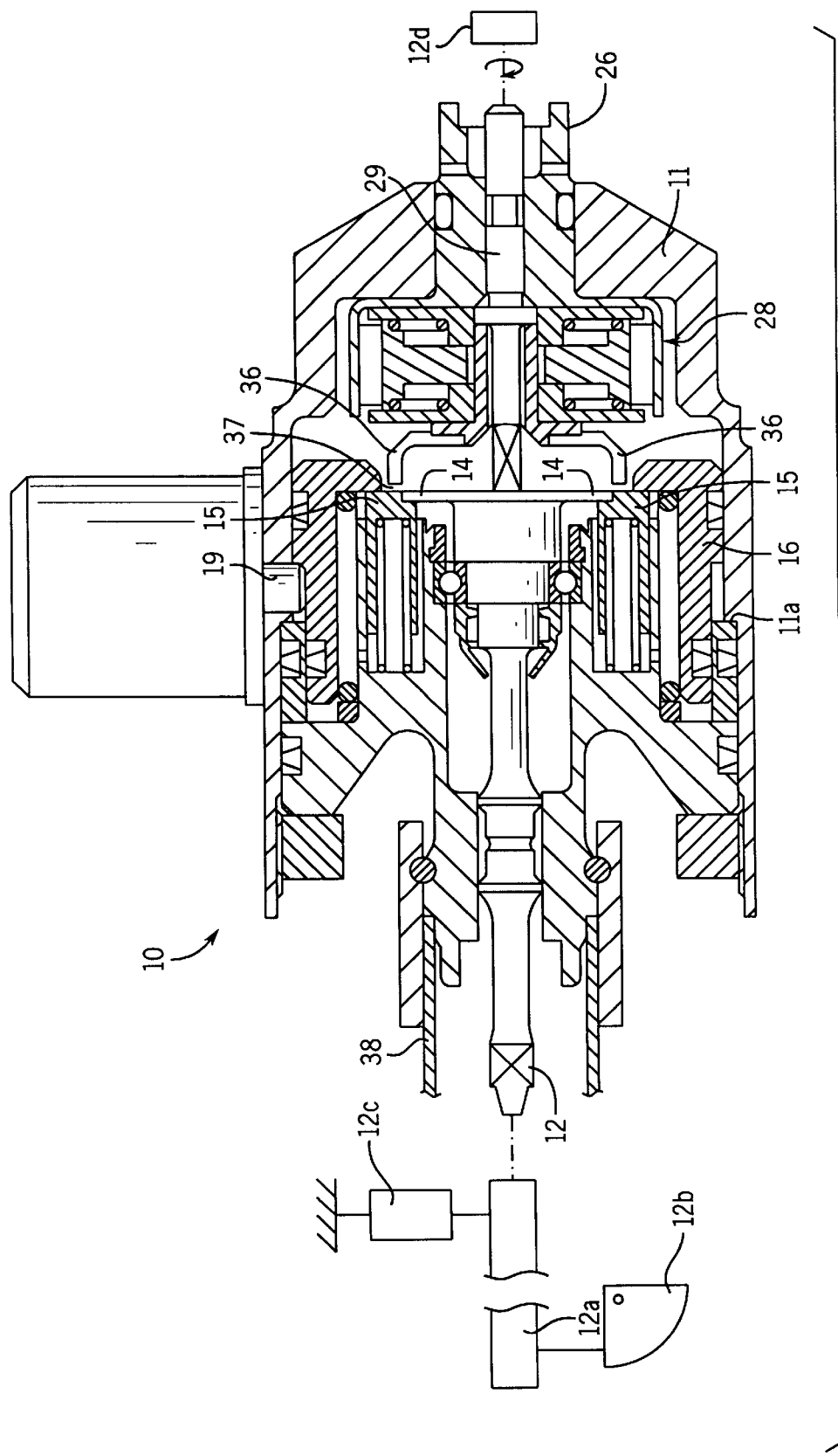
FIG. 3 is a cross-sectional view of a third embodiment of the lock of the present invention.

The lock shown in FIG. 3 differs from that shown in FIG. 2 in that the manual drive arrangement includes unlocking pins 36 and omits the lever 23. Further, the lock pins 15 and the unlocking sleeve 16 operate in the opposite direction to that described in the previous embodiments. The lock is unlocked by applying hydraulic fluid pressure through the pipe 38 to the internal volume of the housing 11, as previously. Hydraulic pressure is applied to the unlocking sleeve 16 and, due to the difference in the internal diameter of the housing 11 caused by the step 11a, produces a force acting to urge the unlocking sleeve 16 to the left. At this stage, the unlocking sleeve 16 is prevented from moving to the left by the presence of the baulk pin 19 in the recess 21. Upon retraction of the baulk pin 19, the unlocking sleeve 16 is permitted to move to the left, pushing the lock pins 15 away from the engaging position.

In order to use the manual drive arrangement, it is not necessary to remove the baulk pin 19, and apply hydraulic pressure to the lock. The manual drive tool (not shown) is inserted into the socket 26 causing the subshaft 29 to move axially within the torque limiting device 28. Axial movement of the subshaft 29 towards the auxiliary shaft 12 causes the unlocking pins 36 to engage a clearance 37 between the unlocking sleeve 16 and the rotor arms 14 and urge the lock pins 15 away from the engaging position. Rotation of the auxiliary shaft 12 by the manual drive tool is then possible.

In each of the above described embodiments, it is possible to provide the lock with a variable displacement transducer 12d in order to obtain feedback as to the position of the actuators in a thrust reverser mechanism. Such a transducer 12d can be of the type disclosed in EP 0 450 880 and its counterpart U.S. Pat. No. 5,097,933, the contents of which are incorporated herein by reference.

It will be understood that the lock of the invention may be applied to a variety of thrust reverser actuators and mechanisms, the latter including single and multi-thrust reverser element types.

What is claimed is:

1. A lock for a thrust reverser mechanism having actuator means for operating a thrust reverser element, the lock comprising a lock device connectable, in use, to said actuator means for preventing operation of the latter, the lock device being operable hydraulically to unlock the lock so as to free the actuator means in operation, and, incorporating in the same lock device, an electro-mechanical baulking device arranged so as normally to prevent hydraulic actuation of the lock device and being operable to permit hydraulic actuation of the lock device when required.

2. A lock according to claim 1, including connecting means adapted to connect the lock device, in use, to the actuator means, the lock device acting on the connecting means to prevent or limit operation of the actuator means.

3. A lock according to claim 2, wherein the connecting means is an auxiliary rotary shaft for connection to a synchronizing shaft interconnecting a plurality of actuator means, the lock device being arranged to prevent or limit rotational movement of the auxiliary rotary shaft.

4. A lock according to claim 3, wherein the lock device comprises at least one rotary stop on the auxiliary rotary shaft and at least one locking element carried by adjacent structure and biased towards a position of engagement with the rotary stop.

5. A lock according to claim 4, wherein the rotary stop on the auxiliary rotary shaft is a radial arm carried by the auxiliary rotary shaft.

6. A lock according to claim 4, wherein the locking element is movable away from the engagement position in a direction parallel to the axis of the auxiliary rotary shaft.

7. A lock according to claim 1, wherein the electro-mechanical baulking device includes a baulk member and a solenoid operable to withdraw the baulk member from its locking position.

8. A lock according to claim 7, wherein the baulk member is movable radially of the auxiliary rotary shaft into and out of its locking position.

9. A lock according to claim 1, further including a self-calibrating transducer arranged to provide a feedback signal, in use, representing the positions of the actuator means of an associated thrust reverser mechanism.

10. A lock according to claim 4, wherein a manual drive mechanism is provided comprising a connector for receiving a drive tool, the drive mechanism being operable to move the or each locking element away from its engagement position.

11. A lock according to claim 10, wherein the manual drive mechanism is arranged to rotate the auxiliary rotary shaft and thereby operate the thrust reverser mechanism by way of the synchronising shaft.

12. A lock according to claim 11, wherein the manual drive mechanism includes a torque limiter operable to limit torque transmission from the drive tool to the auxiliary rotary shaft.

13. A lock according to claim 3, wherein the lock is provided at an end portion of the synchronising shaft.

14. A piston/cylinder actuator in combination with a lock according to claim 1.

15. A thrust reverser mechanism including an actuator and lock combination according to claim 14.

16. A thrust reverser mechanism including a lock according to claim 1.

* * * * *